US008397693B2

(12) United States Patent
Nelander

(10) Patent No.: US 8,397,693 B2
(45) Date of Patent: Mar. 19, 2013

(54) ENGINE INCLUDING SYSTEM AND METHOD FOR REDUCING OIL PULL-OVER IN COMBUSTION CHAMBER

(75) Inventor: Christopher Paul Nelander, West Bloomfield, MI (US)

(73) Assignee: GM Global Technology Operations LLC

( * ) Notice: Subject to any disclaimer, the term of this patent is extended or adjusted under 35 U.S.C. 154(b) by 480 days.

(21) Appl. No.: 12/728,564

(22) Filed: Mar. 22, 2010

(65) Prior Publication Data
US 2011/0226203 A1    Sep. 22, 2011

(51) Int. Cl.
*F02D 13/06* (2006.01)
*F02D 13/08* (2006.01)
*F02D 41/12* (2006.01)
(52) U.S. Cl. ......... 123/321; 123/322; 123/324; 123/325
(58) Field of Classification Search .................. 123/321, 123/322, 324, 325
See application file for complete search history.

(56) References Cited

U.S. PATENT DOCUMENTS

| | | | | |
|---|---|---|---|---|
| 5,809,964 | A * | 9/1998 | Meistrick et al. | 123/321 |
| 6,189,504 | B1 * | 2/2001 | Israel et al. | 123/321 |
| 7,317,984 | B2 * | 1/2008 | Lewis | 701/112 |
| 2011/0100324 | A1 * | 5/2011 | Xin | 123/322 |

\* cited by examiner

*Primary Examiner* — Erick Solis
(74) *Attorney, Agent, or Firm* — Harness, Dickey & Pierce, P.L.C.

(57) ABSTRACT

An engine assembly may include an engine structure, a piston, a first valve and a first valve actuation assembly. The engine structure may define a combustion chamber and a first port in communication with the combustion chamber. The piston may be located within the combustion chamber and be reciprocally displaceable between a top dead center position and bottom dead center position. The first valve may selectively open and close the first port. The first valve actuation assembly may be engaged with the first valve and be operable in first and second modes. The first valve actuation assembly may be operated in the first mode when fuel is provided to the combustion chamber and operated in the second mode when fuel is cutoff from the combustion chamber. The first mode and second modes may provide different opening durations of the first valve in order to reduce vacuum in the combustion chamber.

20 Claims, 6 Drawing Sheets

ENGINE INCLUDING SYSTEM AND METHOD FOR REDUCING OIL PULL-OVER IN COMBUSTION CHAMBER

FIELD

The present disclosure relates to engine assemblies, and more specifically to a system and method for reducing oil pull-over into the combustion chamber of an engine assembly.

BACKGROUND

This section provides background information related to the present disclosure which is not necessarily prior art.

Internal combustion engines may combust a mixture of air and fuel in cylinders and thereby produce drive torque. Air and fuel flow into and out of the cylinders may be controlled by a valvetrain. The valvetrain may include a camshaft that actuates intake and exhaust valves and thereby controls the timing and amount of air and fuel entering the cylinders and exhaust gases leaving the cylinders. In a condition in which fuel is no longer being provided to the engine, e.g., during deceleration (such as braking) to reduce fuel consumption, during operation from electric power in a hybrid vehicle or during cylinder deactivation, the engine's pistons may still pump within the cylinders. This is sometimes referred to as "fuel cutoff" or as the "fuel cutoff condition". This pumping without associated combustion may create a pressure differential between the crankcase and combustion chamber, which may lead to oil being pulled from the crankcase into the combustion chamber, intake manifold and/or exhaust manifold. This oil pullover may result in increased oil residue and contamination on the pistons, intake and exhaust manifolds, fuel injectors and valves, as well as increased emissions and poor oil economy.

SUMMARY

This section provides a general summary of the disclosure, and is not a comprehensive disclosure of its full scope or all of its features.

An engine assembly may include an engine structure, a piston, a first valve and a first valve actuation assembly. The engine structure may define a combustion chamber and a first port in communication with the combustion chamber. The piston may be located within the combustion chamber and be reciprocally displaceable from a top dead center position to a bottom dead center position during an intake stroke and displaceable from the bottom dead center position to the top dead center position during a compression stroke immediately subsequent the intake stroke. The first valve may be supported by the engine structure and may selectively open and close the first port. The first valve actuation assembly may be engaged with the first valve and be operable in first and second modes. The first valve actuation assembly may be operated in the first mode when fuel is provided to the combustion chamber and operated in the second mode when fuel is cutoff from the combustion chamber while the piston reciprocates between the top dead center position and the bottom dead center position. The first mode may provide a first opening duration of the first valve during one of the intake stroke and the compression stroke. The second mode may provide a second opening duration of the first valve during the one of the intake stroke and the compression stroke that is different than the first opening duration to reduce vacuum in the combustion chamber.

An engine assembly may include an engine structure, a piston, an intake valve, an exhaust valve, an intake valve actuation assembly and an exhaust valve actuation assembly. The engine structure may define a combustion chamber and an intake port and an exhaust port in communication with the combustion chamber. The piston may be located within the combustion chamber and be reciprocally displaceable from a top dead center position to a bottom dead center position during an intake stroke and displaceable from the bottom dead center position to the top dead center position during a compression stroke immediately subsequent the intake stroke. The intake valve may be supported by the engine structure and may selectively open and close the intake port. The exhaust valve may be supported by the engine structure and may selectively open and close the exhaust port. The intake valve actuation assembly may be engaged with the intake valve and be operable in first and second modes. The intake valve actuation assembly may be operated in the first mode when fuel is provided to the combustion chamber and operated in the second mode when fuel is cutoff from the combustion chamber while the piston reciprocates between the top dead center position and the bottom dead center position. The first mode may provide a first opening duration of the intake valve during one of the intake stroke and the compression stroke. The second mode may provide a second opening duration of the intake valve during the one of the intake stroke and the compression stroke that is different than the first opening duration to reduce vacuum in the combustion chamber. The exhaust valve actuation assembly may be engaged with the exhaust valve and be operable in third and fourth modes. The exhaust valve actuation may be operated in the third mode when fuel is provided to the combustion chamber and operated in the fourth mode when fuel is cutoff from the combustion chamber while the piston reciprocates between the top dead center position and the bottom dead center position. The third mode may provide a third opening duration of the exhaust valve during one of the intake stroke and the compression stroke. The fourth mode may provide a fourth opening duration of the exhaust valve during the one of the intake stroke and the compression stroke that is different than the third opening duration to reduce vacuum in the combustion chamber. The first and second opening durations may occur during the intake stroke. The second opening duration may be greater than the first opening duration. The third and fourth opening durations may occur during the compression stroke. The third opening duration may be greater than the fourth opening duration.

A method of operating the engine assembly of the present disclosure may include reciprocating a piston located within a combustion chamber of an engine structure from a top dead center position to a bottom dead center position during an intake stroke and from the bottom dead center position to the top dead center position during a compression stroke immediately subsequent the intake stroke. The method may additionally include opening a first valve to provide communication between the combustion chamber and a first port of the engine structure for a first opening duration during one of the intake stroke and the compression stroke when fuel is provided to the combustion chamber while the piston is reciprocating. Further, the method may include opening the first valve to provide communication between the combustion chamber and the first port for a second opening duration during the one of the intake stroke and the compression stroke when fuel is cutoff from the combustion chamber while the piston is reciprocating. The second opening duration may be different than the first opening duration to reduce vacuum in the combustion chamber.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
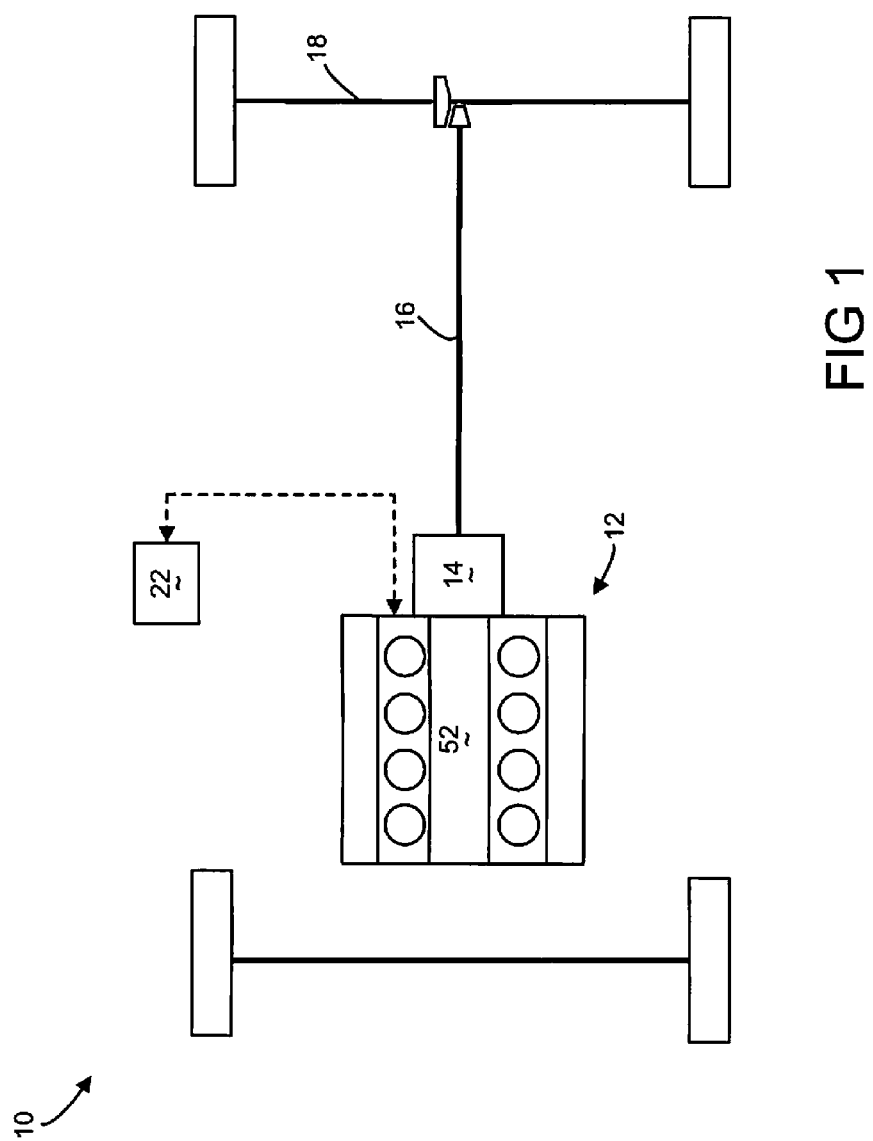
FIG. 1 is a schematic illustration of a vehicle assembly according to the present disclosure.

With reference to FIG. 1, a vehicle assembly 10 is illustrated. The vehicle assembly 10 may include an engine assembly 12, a transmission 14, an output shaft 16, a drive axle 18 and a control module 22. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. The transmission 14 may be engaged with the engine assembly 12 and use power from the engine assembly 12 to drive the output shaft 16 and power rotation of the drive axle 18.

Figure 2:
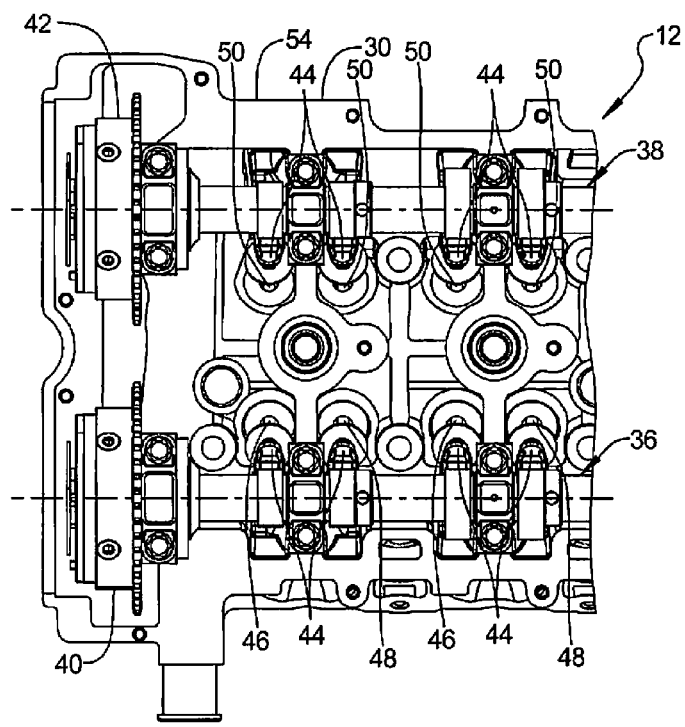
FIG. 2 is a fragmentary plan view of the engine assembly of FIG. 1.
Figure 3:
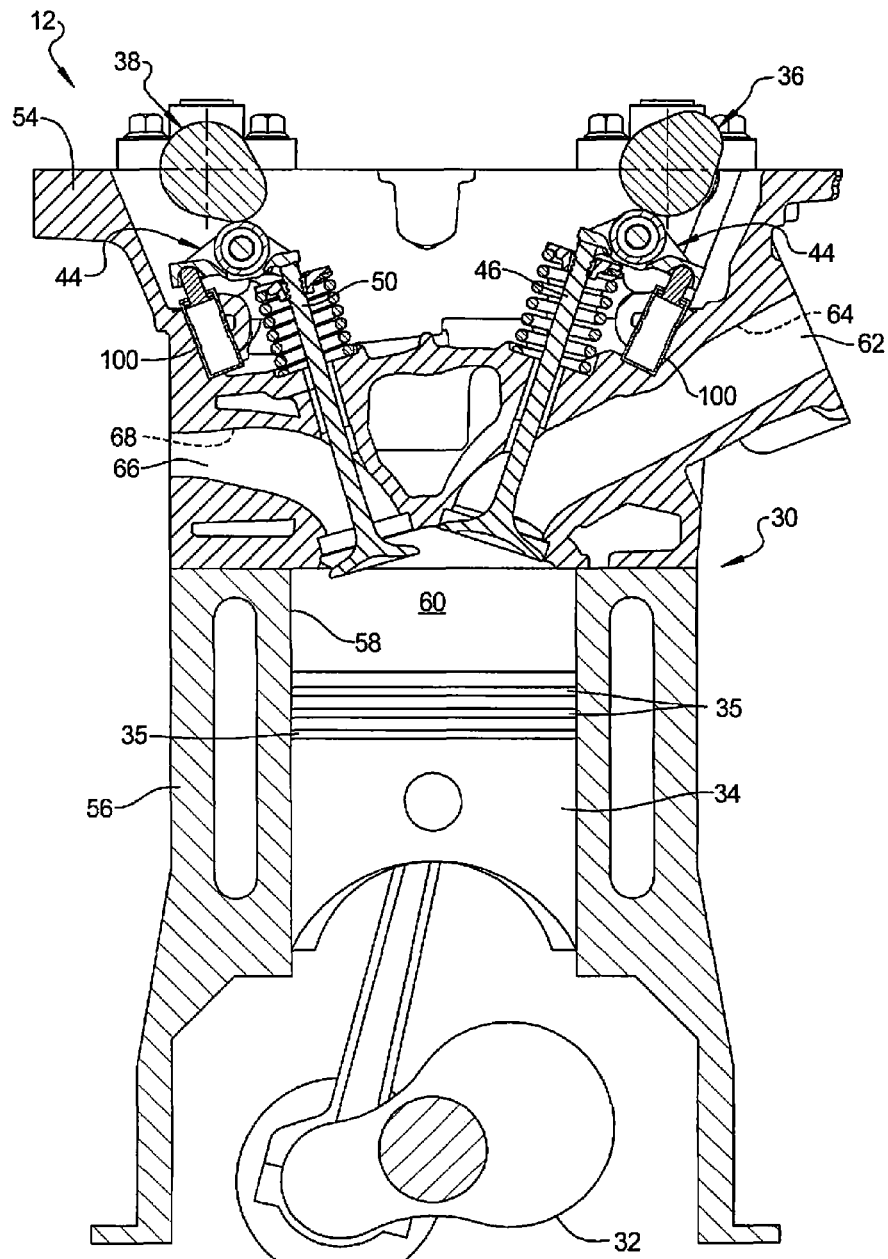
FIG. 3 is a schematic section view of the engine assembly of FIG. 1.

With additional reference to FIGS. 2 and 3, the engine assembly 12 may include an engine structure 30, a crankshaft 32 rotationally supported by the engine structure 30, pistons 34 coupled to the crankshaft 32, intake and exhaust camshaft assemblies 36, 38 rotationally supported on the engine structure 30, intake and exhaust cam phasers 40, 42, valve lift assemblies 44, first and second intake valves 46, 48, exhaust valves 50, and an intake manifold 52 (FIG. 1). In the present non-limiting example, the engine assembly 12 is shown as a dual overhead camshaft engine with the engine structure 30 including a cylinder head 54 rotationally supporting the intake and exhaust camshaft assemblies 36, 38. It is understood, however, that the present disclosure is not limited to overhead camshaft configurations The engine block 56 may define cylinder bores 58. The cylinder head 54 and the cylinder bores 58 in the engine block 56 may cooperate to define combustion chambers 60. The pistons 34 may be disposed within the combustion chambers 60. As seen in FIG. 3, the cylinder head 54 may define first and second intake ports 62, 64 and first and second exhaust ports 66, 68 for each combustion chamber 60. The first intake valves 46 may open and close the first intake ports 62 and the second intake valves 48 may open and close the second intake ports 64. The combination of the intake camshaft assembly 36 and the intake cam phaser 40 may form a valve actuation assembly. The valve lift assemblies 44 may be engaged with the intake camshaft assembly 36 and the first and second intake valves 46, 48 to open the first and second intake ports 62, 64. While the description in the present disclosure relates to the intake camshaft assembly 36, first and second intake valves 46, 48 and intake cam phaser 40, it is understood that the present disclosure applies equally to the exhaust camshaft assembly 38, exhaust valves 50 and exhaust cam phaser 42, which may be constructed and operated similarly.

Figure 4:
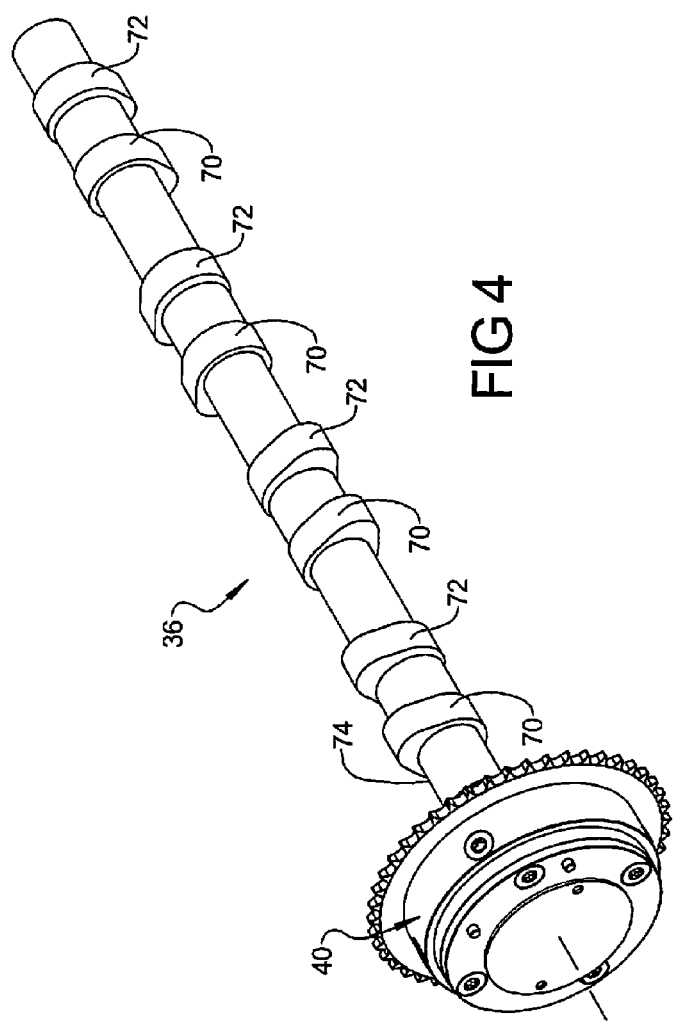
FIG. 4 is a perspective view of the intake cam phaser and intake camshaft assembly shown in FIG. 2.

By way of non-limiting example, as seen in FIG. 4, the intake camshaft assembly 36 may include first and second intake lobes 70, 72 and a shaft 74. The shaft 74 may be rotationally supported by the engine structure 30. The first and second intake lobes 70, 72 may be located on and fixed for rotation with the shaft 74.

Figure 5:
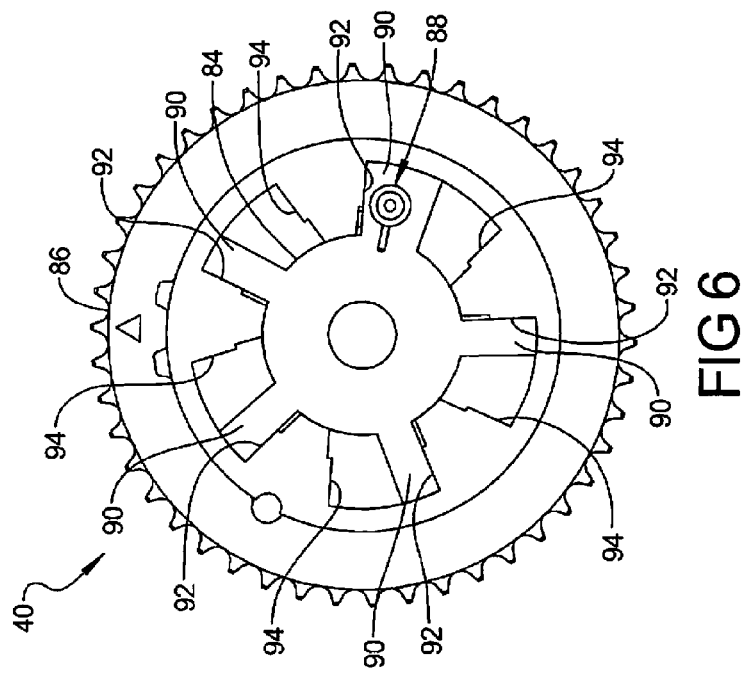
FIG. 5 is a schematic illustration of the intake cam phaser of FIG. 2 in an advanced position.
Figure 6:
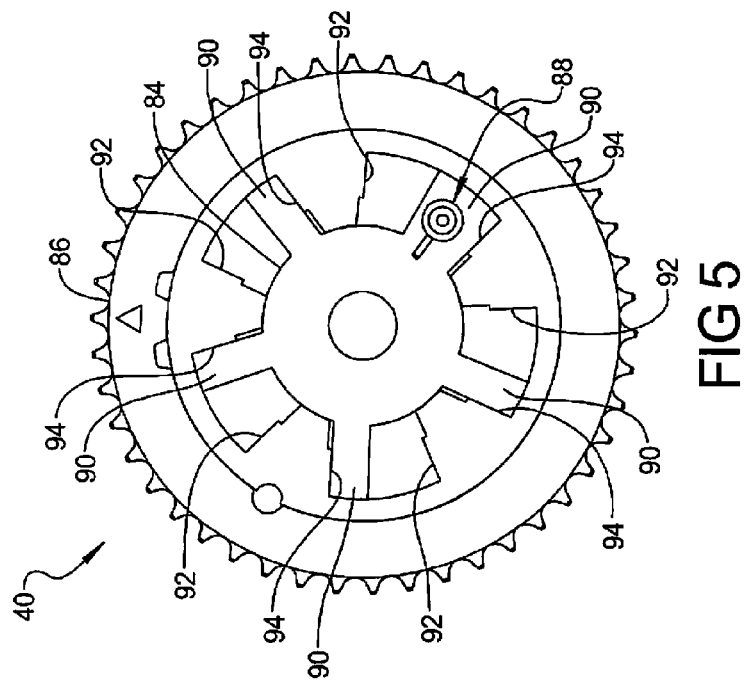
FIG. 6 is a schematic illustration of the intake cam phaser of FIG. 2 in a retarded position.

As seen in FIGS. 5 and 6, the intake cam phaser 40 may include a rotor 84, a stator 86 and a lock mechanism 88. The stator 86 may be rotationally driven by the crankshaft 32 via a drive mechanism, such as a belt or a chain, (not shown) and the rotor 84 may be rotationally supported within the stator 86. By way of non-limiting example, the rotor 84 may include radially extending vanes 90 cooperating with the stator 86 to define hydraulic advance and retard chambers 92, 94 in communication with pressurized fluid, such as oil. While illustrated as a hydraulically actuated vane phaser, it is understood that the present disclosure applies equally to any type of cam phaser arrangement. Control module 22 (FIG. 1) may assist in the operation of the engine assembly 12, including the operation of the intake and exhaust cam phasers 40, 42, as described below.

The shaft 74 (and therefore first and second intake lobes 70, 72) may be fixed for rotation with the rotor 84. The rotor 84 may be displaced between an advanced position (FIG. 5) and a retarded position (FIG. 6) to vary the opening timing of the first and second intake valves 46, 48. It is understood, however, that the present disclosure equally applies to camshaft assemblies for which only a subset of lobes may be displaced between advanced and retarded positions, as well as camshaft assemblies that provide for independent displacement of subsets of lobes (for example, a camshaft assembly in which a first subset of lobes may be advanced/retarded while a second subset of lobes may be independently advanced/retarded).

Oil (not shown) may be present within the engine block 60. Oil may be used, for example, to lubricate the piston 34 and piston rings 35 while the piston 34 is reciprocating between a top dead center position and a bottom dead center position within the cylinder bore 58. Under certain conditions, for example, fuel cutoff during deceleration (during braking, etc.) to reduce fuel consumption, during operation from electric power in a hybrid vehicle or during cylinder deactivation, the piston 34 may reciprocate when no fuel is provided to the combustion chamber 60, which results in pumping without a combustion event. During such pumping, oil may be pulled over the piston rings 35 (FIG. 3) and into the combustion chamber 60.

In order to decrease the oil pullover described above, the valve actuation assembly may move to a low vacuum position before fuel cutoff. The low vacuum position of the valve actuation assembly modifies the position of intake lobes 70, 72 such that the level of vacuum within combustion chamber 60 may be reduced, optimally below the level at which oil pullover occurs. This may be accomplished, for example, by the cam phaser 40 moving the lobes 70, 72 to the advanced position, the retarded position, or any position therebetween.

The level of vacuum within the combustion chamber 60 during an intake stroke may increase as the volume of gas within the combustion chamber 60 decreases. For example, as the time period during which the exhaust valves 50 are open (opening duration) during a compression stroke increases, the volume of gas within the combustion chamber 60 may decrease and the level of vacuum in the combustion chamber 60 may increase during the subsequent intake stroke. Additionally, as the time period during which the intake valves 46, 48 and exhaust valves 50 are closed during an intake stroke increases, the level of vacuum in the combustion chamber 60 may similarly increase during that intake stroke. Thus, while the low vacuum position of the valve actuation assembly may vary across engine assemblies, the low vacuum position may generally relate to an increase in the duration that the intake valves 46, 48 and exhaust valves 50 are open (opening duration) during an intake stroke and/or an increase in the duration that the exhaust valves 50 are closed during a compression stroke.

By way of non-limiting example, the valve actuation assembly may move to the low vacuum position upon determination of a condition for fuel cutoff, for example, by the control module 22 (FIG. 1), which indicates that the engine assembly 12 desires to stop combustion. The valve actuation assembly may be moved to the low vacuum position in a short time period, e.g., approximately 50 milliseconds. Fuel cutoff may occur after the valve actuation assembly has been positioned in the low vacuum position, for example, by being delayed after determination of a condition for fuel cutoff by a time period greater than the time period associated with moving the valve actuation assembly to the low vacuum position.

Figure 7:
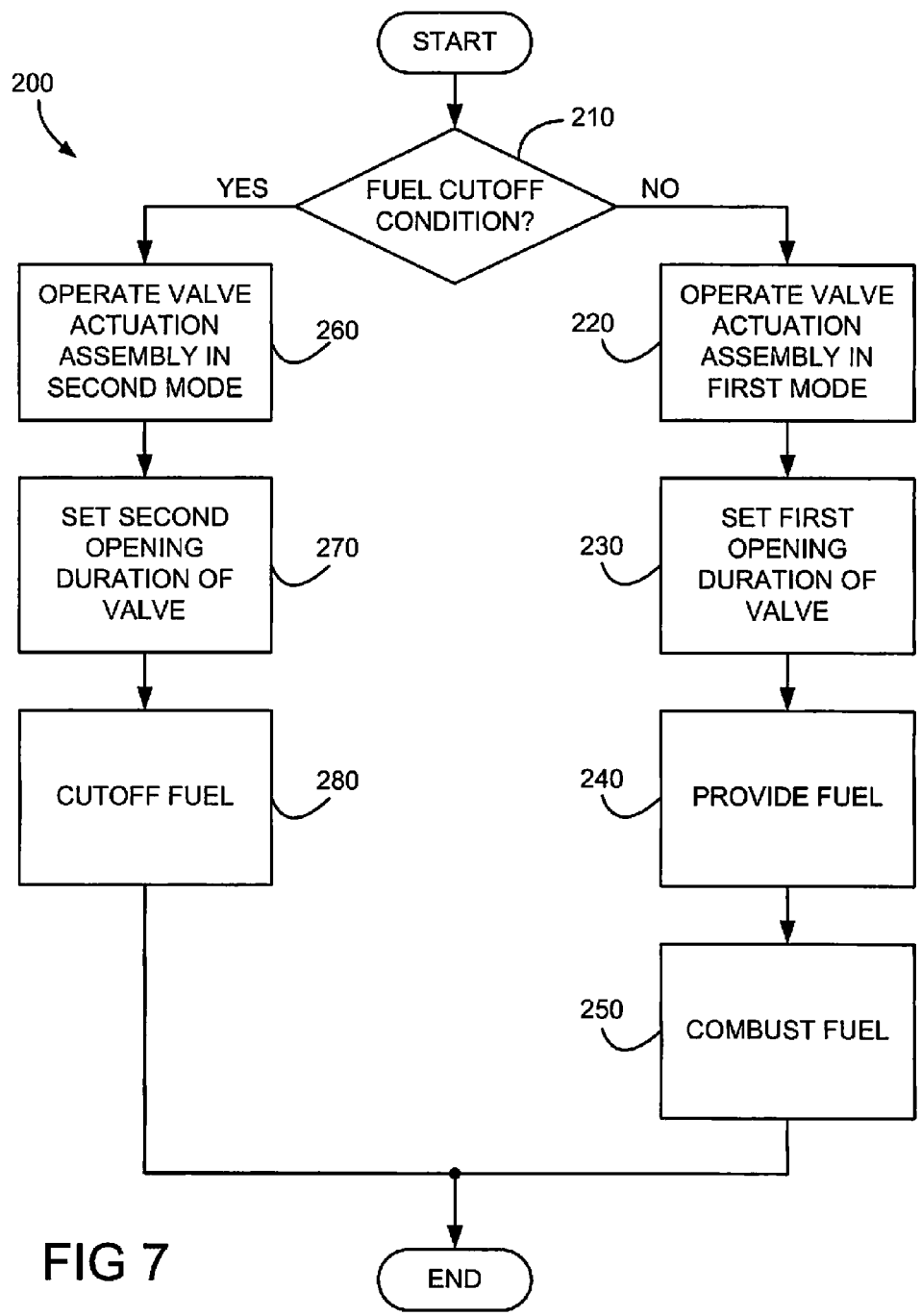
FIG. 7 is a flow chart illustrating engine operation according to the present disclosure.

FIG. 7 illustrates a non-limiting example of control logic 200 for engine operation according to the present disclosure. Control logic 200 may continuously loop during operation of the engine. Control logic 200 begins at step 210 where a determination may be made whether a fuel cutoff condition is desired. Non-limiting examples of a fuel cutoff condition may include fuel cutoff during deceleration (for example, braking) to reduce fuel consumption, fuel cutoff during operation from electric power in a hybrid vehicle and deactivation of a subset of the cylinders in a multi-cylinder engine during cylinder deactivation. If fuel cutoff is not desired, control logic 200 may proceed to step 220 at which the valve actuation assembly may be operated in a first mode. The first mode may correspond with setting an opening duration of the valve to a first opening duration at step 230. Fuel may be provided to the combustion chamber at step 240. The control logic 200 may then proceed to step 250 at which the fuel is combusted, after which control logic 200 may terminate and start over again.

If fuel cutoff is desired at step 210, the control logic 200 may proceed to step 260 at which the valve actuation assembly may be operated in a second mode. The second mode may correspond with setting an opening duration of the valve to a second opening duration at step 270. The second opening duration may be different than the first opening duration in order to reduce the vacuum within the combustion chamber. For example, if the first and second opening durations relate to the opening duration of the intake valve(s) during the intake stroke, the second intake duration may be greater than the first intake duration such that a larger volume of gas may be provided to the combustion chamber and the vacuum in the combustion chamber may be reduced, as described above. Similarly, if the first and second opening durations relate to the opening duration exhaust valve(s) during the compression stroke, the first intake duration may be greater than the second intake duration such that vacuum in the combustion chamber may be reduced, as described above. The control logic 200 may then proceed to step 280 at which fuel is cutoff to the combustion chamber, after which control logic 200 may terminate and start over again.

What is claimed is:

1. An engine assembly comprising:
   an engine structure defining a combustion chamber and a first port in communication with the combustion chamber;
   a piston located within the combustion chamber and reciprocally displaceable from a top dead center position to a bottom dead center position during an intake stroke and displaceable from the bottom dead center position to the top dead center position during a compression stroke immediately subsequent the intake stroke;
   a first valve supported by the engine structure and selectively opening and closing the first port; and
   a first valve actuation assembly engaged with the first valve and operable in first and second modes, the first valve actuation assembly operated in the first mode when fuel is provided to the combustion chamber and operated in the second mode when fuel is cutoff from the combustion chamber while the piston reciprocates between the top dead center position and the bottom dead center position during a fuel cutoff condition comprising one of fuel cutoff during electric operation of a hybrid vehicle that includes the engine assembly and deactivation of less than all cylinders of the engine assembly, the first mode providing a first opening duration of the first valve during one of the intake stroke and the compression stroke and the second mode providing a second opening duration of the first valve during the one of the intake stroke and the compression stroke that is different than the first opening duration to reduce vacuum in the combustion chamber.

2. The engine assembly of claim 1, wherein the first port includes an intake port and the first valve includes an intake valve.

3. The engine assembly of claim 2, wherein the first and second opening durations occur during the intake stroke and the second opening duration is greater than the first opening duration.

4. The engine assembly of claim 2, wherein the first valve actuation assembly includes an intake camshaft assembly and an intake cam phaser.

5. The engine assembly of claim 1, wherein the first port includes an exhaust port and the first valve includes an exhaust valve.

6. The engine assembly of claim 5, wherein the first and second opening durations occur during the compression stroke and the first opening duration is greater than the second opening duration.

7. The engine assembly of claim 5, wherein the first valve actuation assembly includes an exhaust camshaft assembly and an exhaust cam phaser.

8. The engine assembly of claim 1 further comprising:
   a second valve supported by the engine structure and selectively opening and closing a second port in communication with the combustion chamber defined by the engine structure; and
   a second valve actuation assembly engaged with the second valve and operable in third and fourth modes, the second valve actuation assembly operated in the third mode when fuel is provided to the combustion chamber and operated in the fourth mode when fuel is cutoff from the combustion chamber while the piston reciprocates between the top dead center position and the bottom dead center position, the third mode providing a third opening duration of the second valve during one of the intake stroke and the compression stroke and the fourth mode providing a fourth opening duration of the second valve during the one of the intake stroke and the compression stroke that is different than the third opening duration to reduce vacuum in the combustion chamber.

9. The engine assembly of claim 8, wherein the second port includes an exhaust port and the second valve includes an exhaust valve.

10. The engine assembly of claim 9, wherein the third and fourth opening durations occur during the compression stroke and the third opening duration is greater than the fourth opening duration.

11. The engine assembly of claim 9, wherein the second valve actuation assembly includes an exhaust camshaft assembly and an exhaust cam phaser.

12. An engine assembly comprising:
   an engine structure defining a combustion chamber and an intake port and an exhaust port in communication with the combustion chamber;
   a piston located within the combustion chamber and reciprocally displaceable from a top dead center position to a bottom dead center position during an intake stroke and displaceable from the bottom dead center position to the top dead center position during a compression stroke immediately subsequent the intake stroke;
   an intake valve supported by the engine structure and selectively opening and closing the intake port;
   an exhaust valve supported by the engine structure and selectively opening and closing the exhaust port;
   an intake valve actuation assembly engaged with the intake valve and operable in first and second modes, the intake valve actuation assembly operated in the first mode when fuel is provided to the combustion chamber and operated in the second mode when fuel is cutoff from the combustion chamber while the piston reciprocates between the top dead center position and the bottom dead center position, the first mode providing a first opening duration of the intake valve during one of the intake stroke and the compression stroke and the second mode providing a second opening duration of the intake valve during the one of the intake stroke and the compression stroke that is different than the first opening duration to reduce vacuum in the combustion chamber; and
   an exhaust valve actuation assembly engaged with the exhaust valve and operable in third and fourth modes, the exhaust valve actuation assembly operated in the third mode when fuel is provided to the combustion chamber and operated in the fourth mode when fuel is cutoff from the combustion chamber while the piston reciprocates between the top dead center position and the bottom dead center position, the third mode providing a third opening duration of the exhaust valve during one of the intake stroke and the compression stroke and the fourth mode providing a fourth opening duration of the exhaust valve during the one of the intake stroke and the compression stroke that is different than the third opening duration to reduce vacuum in the combustion chamber, wherein:
   the first and second opening durations occur during the intake stroke and the second opening duration is greater than the first opening duration, and the third and fourth opening durations occur during the compression stroke and the third opening duration is greater than the fourth opening duration.

13. A method comprising:
   reciprocating a piston located within a combustion chamber of an engine structure in an engine assembly from a top dead center position to a bottom dead center position during an intake stroke and from the bottom dead center position to the top dead center position during a compression stroke immediately subsequent the intake stroke;
   opening a first valve to provide communication between the combustion chamber and a first port of the engine structure for a first opening duration during one of the intake stroke and the compression stroke when fuel is provided to the combustion chamber while the piston is reciprocating; and
   opening the first valve to provide communication between the combustion chamber and the first port for a second opening duration during the one of the intake stroke and the compression stroke when fuel is cutoff from the combustion chamber while the piston is reciprocating during a fuel cutoff condition comprising one of fuel cutoff during electric operation of a hybrid vehicle that includes the engine assembly and deactivation of less than all cylinders of the engine assembly, the second opening duration being different than the first opening duration to reduce vacuum in the combustion chamber.

14. The method of claim 13, wherein the first port includes an intake port and the first valve includes an intake valve.

15. The method of claim 14, wherein the first and second opening durations occur during the intake stroke and the second opening duration is greater than the first opening duration.

16. The method of claim 13, wherein the first port includes an exhaust port and the first valve includes an exhaust valve.

17. The method of claim 16, wherein the first and second opening durations occur during the compression stroke and the first opening duration is greater than the second opening duration.

18. The method of claim 13, further comprising:
   opening a second valve to provide communication between the combustion chamber and a second port of the engine structure for a third opening duration during one of the intake stroke and the compression stroke when fuel is provided to the combustion chamber while the piston is reciprocating; and
   opening the second valve to provide communication between the combustion chamber and the second port for a fourth opening duration during the one of the intake stroke and the compression stroke when fuel is cutoff from the combustion chamber while the piston is reciprocating, the fourth opening duration being different than the third opening duration to reduce vacuum in the combustion chamber.

19. The method of claim 18, wherein:
   the first port includes an intake port;
   the first valve includes an intake valve;
   the second port includes an exhaust port; and
   the second valve includes an exhaust valve.

20. The method of claim 13, wherein the fuel cutoff condition comprises one of fuel cutoff during deceleration, fuel cutoff during electric operation of the hybrid vehicle, and deactivation of less than all cylinders of the engine assembly.

* * * * *